US012652613B2

(12) United States Patent
Zhang et al.

(10) Patent No.: US 12,652,613 B2
(45) Date of Patent: Jun. 9, 2026

(54) ROAMING OPTIMIZATION FOR NON-STANDALONE MODE

(71) Applicant: QUALCOMM Incorporated, San Diego, CA (US)

(72) Inventors: Hao Zhang, Shanghai (CN); Tianya Lin, Shanghai (CN); Jianming Cheng, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 315 days.

(21) Appl. No.: 18/262,323

(22) PCT Filed: Mar. 31, 2021

(86) PCT No.: PCT/CN2021/084514
§ 371 (c)(1),
(2) Date: Jul. 20, 2023

(87) PCT Pub. No.: WO2022/205119
PCT Pub. Date: Oct. 6, 2022

(65) Prior Publication Data
US 2024/0080755 A1 Mar. 7, 2024

(51) Int. Cl.
| | |
|---|---|
| *H04W 48/16* | (2009.01) |
| *H04W 48/18* | (2009.01) |
| *H04W 60/04* | (2009.01) |
| *H04W 76/10* | (2018.01) |
| *H04W 84/04* | (2009.01) |

(52) U.S. Cl.
CPC ........... *H04W 48/16* (2013.01); *H04W 48/18* (2013.01); *H04W 60/04* (2013.01); *H04W 76/10* (2018.02); *H04W 84/042* (2013.01)

(58) Field of Classification Search
None
See application file for complete search history.

(56) References Cited

U.S. PATENT DOCUMENTS

| | | | |
|---|---|---|---|
| 2020/0137710 A1* | 4/2020 | Surisetty | H04L 65/1016 |
| 2021/0120408 A1* | 4/2021 | Pazhyannur | H04L 63/101 |
| 2022/0038898 A1* | 2/2022 | Stojanovski | H04W 60/04 |
| 2024/0031799 A1* | 1/2024 | Salmela | H04L 9/3073 |

FOREIGN PATENT DOCUMENTS

| | | | |
|---|---|---|---|
| CN | 111698763 A | 9/2020 | |
| WO | WO-2019040255 A1 * | 2/2019 | H04W 72/56 |
| WO | 2020005880 A1 | 1/2020 | |
| WO | WO-2020037086 A1 * | 2/2020 | H04W 48/12 |
| WO | 2020149240 A1 | 7/2020 | |
| WO | WO-2022071673 A1 * | 4/2022 | H04W 36/144 |

OTHER PUBLICATIONS

International Search Report and Written Opinion—PCT/CN2021/084514—ISA/EPO—Nov. 22, 2021.

* cited by examiner

*Primary Examiner* — Jay L Vogel

(74) *Attorney, Agent, or Firm* — Muncy, Geissler, Olds & Lowe, P.C./Qualcomm Incorporated

(57) ABSTRACT

One or more techniques for roaming optimization for non-standalone operation mode of a user equipment (UE) are disclosed.

30 Claims, 7 Drawing Sheets

500

UE

510
Read RPPL_NSA

520
Conduct PLMN Search To Determine Roaming PLMN Set When Roaming

530
RPPL_NSA And Roaming PLMN Set Have One Or More PLMNs In Common?

Y                    N

540
Establish Communication In NSA Mode With Common PLMN

550
Select Roaming PLMN From Roaming PLMN Set

560
Selected Roaming PLMN Support NSA Mode?

N          Y

580
More Roaming PLMN?

Y          N

570
Update RPPL_NSA

ROAMING OPTIMIZATION FOR NON-STANDALONE MODE

CROSS-REFERENCE TO RELATED APPLICATIONS

The present application for patent is a national stage application, filed under 35 U.S.C. § 371, of International Patent Application No. PCT/CN2021/084514, entitled, "ROAMING OPTIMIZATION FOR NON-STANDALONE MODE", filed Mar. 31, 2021, which is assigned to the assignee hereof and is expressly incorporated herein by reference in its entirety.

TECHNICAL FIELD

Various aspects described herein generally relate to wireless communication systems, and more particularly, to roaming optimization for non-standalone (NSA) mode.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long-Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

This summary identifies features of some example aspects, and is not an exclusive or exhaustive description of the disclosed subject matter. Whether features or aspects are included in, or omitted from this summary is not intended as indicative of relative importance of such features. Additional features and aspects are described, and will become apparent to persons skilled in the art upon reading the following detailed description and viewing the drawings that form a part thereof.

An exemplary user equipment (UE) is disclosed. The UE may comprise a memory, a transceiver and a processor communicatively connected to the memory and the processor.

The processor may be configured to read a roaming preferred public land mobile network (PLMN) list for non-standalone (NSA) service (RPPL_NSA) comprising a list of one or more NSA PLMNs that allow access to the UE while roaming. The processor may also be configured to conduct a PLMN search to determine a roaming PLMN set when the UE is roaming. The roaming PLMN set may comprise one or more roaming PLMNs. The processor may further be configured to determine whether the RPPL_NSA and the roaming PLMN set have one or more PLMNs in common. The processor may yet be configured to establish communication in an NSA mode with a common PLMN when it is determined that the RPPL_NSA and the roaming PLMN set do have one or more PLMNs in common. The common PLMN may be one of the PLMNs common to both the RPPL_NSA and the roaming PLMN set.

An exemplary method performed by a user equipment (UE) is disclosed. The method may comprise reading a roaming preferred public land mobile network (PLMN) list for non-standalone (NSA) service (RPPL_NSA) comprising a list of one or more NSA PLMNs that allow access to the UE while roaming. The method may also comprise conducting a PLMN search to determine a roaming PLMN set when the UE is roaming. The roaming PLMN set may comprise one or more roaming PLMNs. The method may further comprise determining whether the RPPL_NSA and the roaming PLMN set have one or more PLMNs in common. The method may yet comprise establishing communication in an NSA mode with a common PLMN when it is determined that the RPPL_NSA and the roaming PLMN set do have one or more PLMNs in common. The common PLMN may be one of the PLMNs common to both the RPPL_NSA and the roaming PLMN set.

Another exemplary user equipment (UE) is disclosed. The UE may comprise means for reading a roaming preferred public land mobile network (PLMN) list for non-standalone (NSA) service (RPPL_NSA) comprising a list of one or more NSA PLMNs that allow access to the UE while roaming. The UE may also comprise means for conducting a PLMN search to determine a roaming PLMN set when the UE is roaming. The roaming PLMN set may comprise one or more roaming PLMNs. The UE may further comprise means for determining whether the RPPL_NSA and the roaming PLMN set have one or more PLMNs in common. The UE may yet comprise means for establishing communication in an NSA mode with a common PLMN when it is determined that the RPPL_NSA and the roaming PLMN set do have one or more PLMNs in common. The common PLMN may be one of the PLMNs common to both the RPPL_NSA and the roaming PLMN set.

A non-transitory computer-readable medium storing computer-executable instructions for a user equipment (UE) is disclosed. The executable instructions may comprise one or more instructions instructing the UE to read a roaming preferred public land mobile network (PLMN) list for non-standalone (NSA) service (RPPL_NSA) comprising a list of one or more NSA PLMNs that allow access to the UE while roaming. The executable instructions may also comprise one or more instructions instructing the UE to conduct a PLMN search to determine a roaming PLMN set when the UE is roaming. The roaming PLMN set may comprise one or more roaming PLMNs. The executable instructions may further comprise one or more instructions instructing the UE to determine whether the RPPL_NSA and the roaming PLMN set have one or more PLMNs in common. The executable instructions may yet comprise one or more instructions instructing the UE to establish communication in an NSA mode with a common PLMN when it is determined that the RPPL_NSA and the roaming PLMN set do have one or more PLMNs in common. The common PLMN may be one of the PLMNs common to both the RPPL_NSA and the roaming PLMN set.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Figure 1:
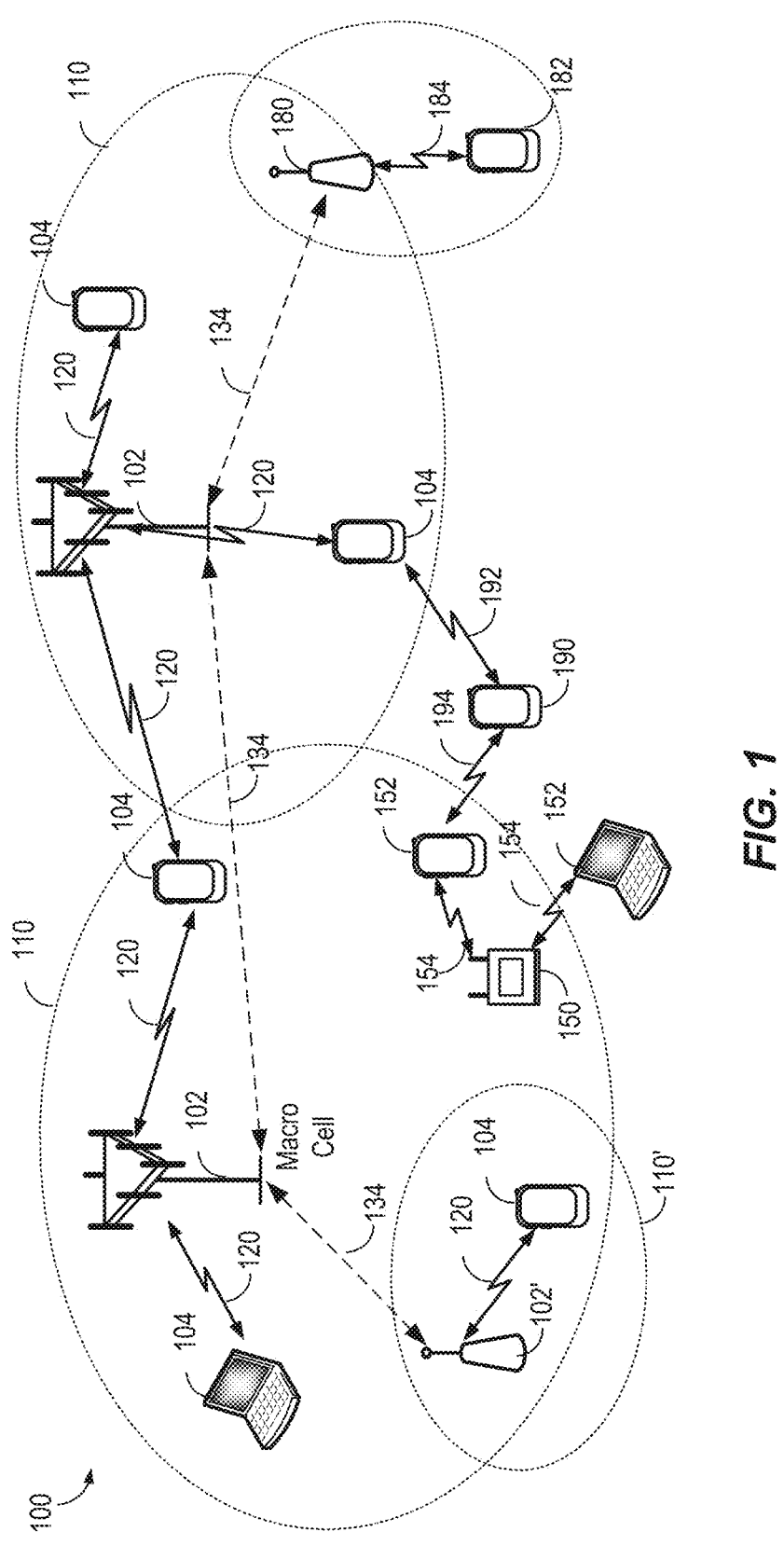
FIG. 1 illustrates an exemplary wireless communications system in accordance with one or more aspects of the disclosure.

Aspects of the subject matter are provided in the following description and related drawings directed to specific examples of the disclosed subject matter. Alternates may be devised without departing from the scope of the disclosed subject matter. Additionally, well-known elements will not be described in detail or will be omitted so as not to obscure the relevant details.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (UE) and "base station" are not intended to be specific or otherwise limited to any particular Radio Access Technology (RAT), unless otherwise noted. In general, such UEs may be any wireless communication device (e.g., a mobile phone, router, tablet computer, laptop computer, tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide edge node signaling functions while in other systems it may provide additional control and/or network management functions.

UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates an exemplary wireless communications system 100 according to one or more aspects. The wireless communications system 100, which may also be referred to as a wireless wide area network (WWAN), may include various base stations 102 and various UEs 104. The base stations 102 may include macro cells (high power cellular base stations) and/or small cells (low power cellular base stations). The macro cells may include Evolved NodeBs (eNBs) where the wireless communications system 100 corresponds to an Long-Term Evolution (LTE) network, gNodeBs (gNBs) where the wireless communications system 100 corresponds to a 5G network, and/or a combination thereof, and the small cells may include femtocells, pico-cells, microcells, etc.

The base stations 102 may collectively form a Radio Access Network (RAN) and interface with an Evolved Packet Core (EPC) or Next Generation Core (NGC) through backhaul links. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, although not shown in FIG. 1, coverage areas 110 may be subdivided into a plurality of cells (e.g., three), or sectors, each cell corresponding to a single antenna or array of antennas of a base station 102. As used herein, the term "cell" or "sector" may correspond to one of a plurality of cells of a base station 102, or to the base station 102 itself, depending on the context.

While neighbor macro cell geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cells may be known as a heterogeneous network. A heterogeneous network may also include Home eNBs (HeNBs) and/or Home gNodeBs, which may provide service to a restricted group known as a closed subscriber group (CSG). The communication links 120 between the base stations 102 and the UEs 104 may include uplink (UL)(also referred to as reverse link) transmissions from a UE 104 to a base station 102 and/or downlink (DL) (also referred to as forward link) transmissions from a base station 102 to a UE 104. The communication links 120 may use multiple input multiple output (MIMO) antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a mmW base station 180 that may operate in mmW frequencies and/or near mmW frequencies in communication with a UE 182. Extremely high frequency (EHF) is part of the radio frequency (RF) range in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 may utilize beamforming 184 with the UE 182 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

The wireless communications system 100 may further include one or more UEs, such as UE 190, that connects indirectly to one or more communication networks via one or more device-to-device (D2D) peer-to-peer (P2P) links. In the embodiment of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192-194 may be supported with any well-known D2D radio access technology (RAT), such as LTE Direct (LTE-D), WiFi Direct (WiFi-D), Bluetooth, and so on. Any of the base stations 102, 102', 180 may send measurement requests (e.g., measurement control order (MCO)) to the UEs 104, 182, 190, and the UE's 104, 182, 190 may respond with measurement reports accordingly.

Figure 2:
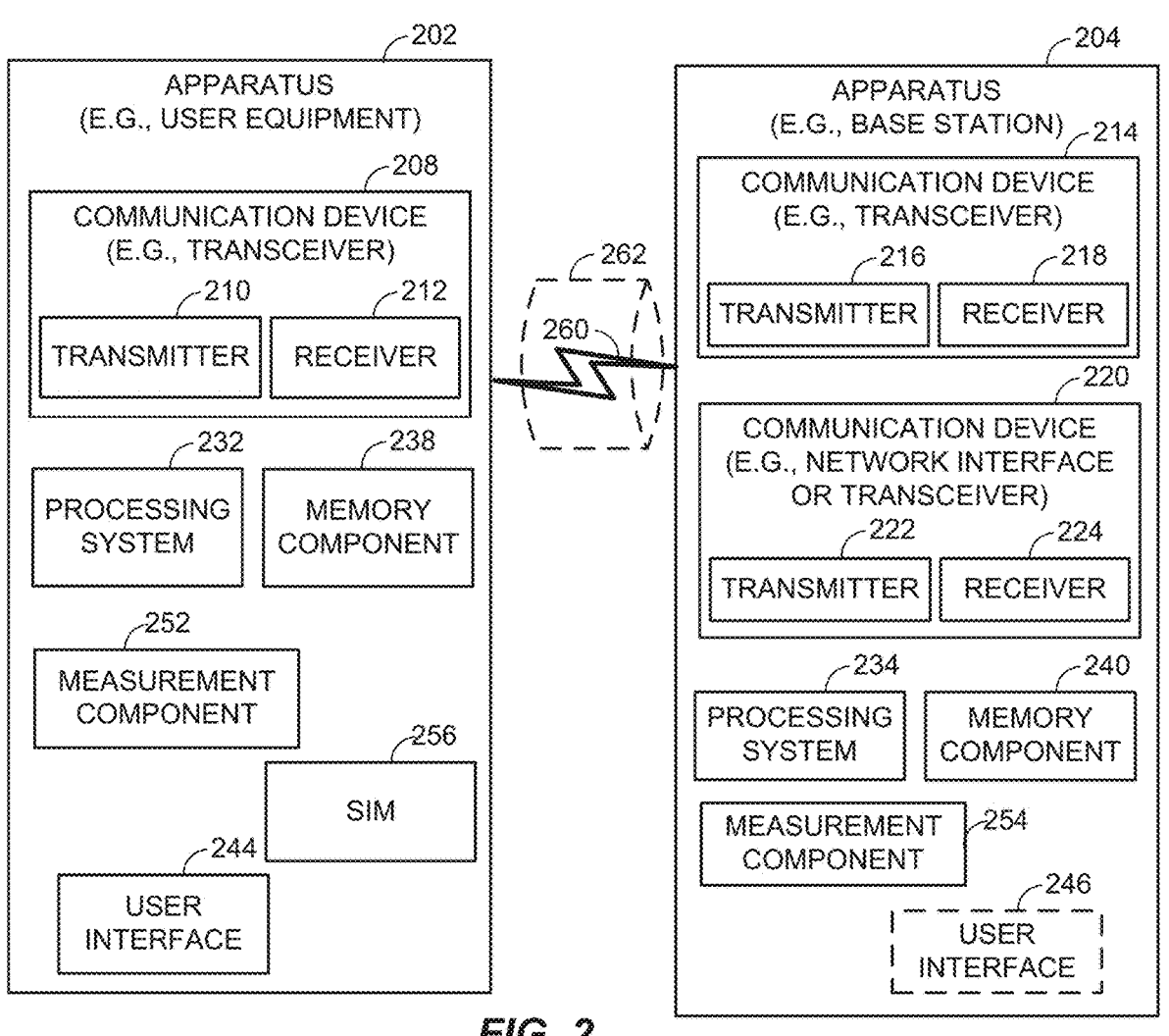
FIG. 2 is a simplified block diagram of several sample aspects of components that may be employed in wireless communication nodes and configured to support communication in accordance with one or more aspects of the disclosure.

FIG. 2 illustrates several sample components (represented by corresponding blocks) that may be incorporated into an apparatus 202 and an apparatus 204 (corresponding to, for example, a UE and a base station (e.g., eNB, gNB), respectively, to support the operations as disclosed herein. As an example, the apparatus 202 may correspond to a UE, and the apparatus 204 may correspond to a network node such as a gNB and/or an eNB. It will be appreciated that the components may be implemented in different types of apparatuses in different implementations (e.g., in an ASIC, in a System-on-Chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The apparatus 202 and the apparatus 204 each may include at least one wireless communication device (represented by the communication devices 208 and 214) for communicating with other nodes via at least one designated RAT (e.g., LTE, New Radio (NR)). Each communication device 208 may include at least one transmitter (represented by the transmitter 210) for transmitting and encoding signals (e.g., messages, indications, information, and so on) and at least one receiver (represented by the receiver 212) for receiving and decoding signals (e.g., messages, indications, information, pilots, and so on) and may be referred to as a communication device or a transceiver. Each communication device 214 may include at least one transmitter (represented by the transmitter 216) for transmitting signals (e.g., messages, indications, information, pilots, and so on) and at least one receiver (represented by the receiver 218) for receiving signals (e.g., messages, indications, information, and so on) and may be referred to as a communication device or a transceiver.

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include a plurality of antennas, such as an antenna array, that permits the respective apparatus to perform transmit "beamforming," as described further herein. Similarly, a receiver may include a plurality of antennas, such as an antenna array, that permits the respective apparatus to perform receive beamforming, as described further herein. In an aspect, the transmitter and receiver may share the same plurality of antennas, such that the respective apparatus can only receive or transmit at a given time, not both at the same time. A wireless communication device (e.g., one of multiple wireless communication devices) of the apparatus 204 may also comprise a Network Listen Module (NLM) or the like for performing various measurements.

The apparatus 204 may include at least one communication device (represented by the communication device 220) for communicating with other nodes. For example, the communication device 220 may comprise a network interface (e.g., one or more network access ports) configured to communicate with one or more network entities via a wire-based or wireless backhaul connection. In some aspects, the communication device 220 may be implemented as a transceiver configured to support wire-based or wireless signal communication. This communication may involve, for example, sending and receiving messages, parameters, or other types of information. Accordingly, in the example of FIG. 2, the communication device 220 is shown as comprising a transmitter 222 and a receiver 224 (e.g., network access ports for transmitting and receiving).

The apparatuses 202 and 204 may also include other components used in conjunction with the operations as disclosed herein. The apparatus 202 may include a processing system 232 for providing functionality relating to, for example, communication with the network. The apparatus 204 may include a processing system 234 for providing functionality relating to, for example, communication with the UEs. In an aspect, the processing systems 232 and 234 may include, for example, one or more general purpose processors, multi-core processors, ASICs, digital signal processors (DSPs), field programmable gate arrays (FPGA), or other programmable logic devices or processing circuitry.

The apparatuses 202 and 204 may include measurement components 252 and 254 that may be used to obtain channel related measurements. The measurement component 252 may measure one or more downlink (DL) signals such as channel state information reference signal (CSI-RS), phase tracking reference signal (PTRS), primary synchronization signal (PSS), secondary synchronization signal (SSS), demodulation reference signal (DMRS), etc. The measurement component 254 may measure one or more uplink (UL) signals such as DMRS, sounding reference signal (SRS), etc.

The apparatuses 202 and 204 may include memory components 238 and 240 (e.g., each including a memory device), respectively, for maintaining information (e.g., information indicative of reserved resources, thresholds, parameters, and so on). In various implementations, memory 238 can comprise a computer-readable medium storing one or more computer-executable instructions for a user equipment (UE) where the one or more instructions instruct apparatus 202 (e.g., processing system 232 in combination with communications device 208 and/or other aspects of apparatus 202) to perform any of the functions of FIGS. 3, 4, and 5. In addition, the apparatuses 202 and 204 may include user interface devices 244 and 246, respectively, for providing indications (e.g., audible and/or visual indications) to a user and/or for receiving user input (e.g., upon user actuation of a sensing device such a keypad, a touch screen, a microphone, and so on).

The apparatus 202 may include a subscriber identity module (SIM) card 256. Within the SIM card 256, one or more home public land mobile networks (HPLMN) and/or equivalent HPLMNs (EHPLMN) may be listed. The SIM card 256 may also include a list of one or more user controlled PLMNs (UPLMN) and/or a list of one or more operator controlled PLMNs (OPLMN).

For convenience, the apparatuses 202 and 204 are shown in FIG. 2 as including various components that may be configured according to the various examples described herein. It will be appreciated, however, that the illustrated blocks may have different functionality in different designs. The components of FIG. 2 may be implemented in various ways. In some implementations, the components of FIG. 2 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 208, 232, 238, and 244 may be implemented by processor and memory component(s) of the apparatus 202 (e.g., by execution of appropriate code and/or by appropriate configuration of processor components). Similarly, some or all of the functionality represented by blocks 214, 220, 234, 240, and 246 may be implemented by processor and memory component(s) of the apparatus 204 (e.g., by execution of appropriate code and/or by appropriate configuration of processor components).

In an aspect, the apparatus 204 may correspond to a "small cell" or a Home gNodeB. The apparatus 202 may transmit and receive messages via a wireless link 260 with the apparatus 204, the messages including information related to various types of communication (e.g., voice, data, multimedia services, associated control signaling, etc.). The wireless link 260 may operate over a communication medium of interest, shown by way of example in FIG. 2 as the medium 262, which may be shared with other communications as well as other RATs. A medium of this type may be composed of one or more frequency, time, and/or space communication resources (e.g., encompassing one or more channels across one or more carriers) associated with communication between one or more transmitter/receiver pairs, such as the apparatus 204 and the apparatus 202 for the medium 262.

In general, the apparatus 202 and the apparatus 204 may operate via the wireless link 260 according to one or more radio access types, such as LTE, LTE-U, or NR, depending on the network in which they are deployed. These networks may include, for example, different variants of CDMA networks (e.g., LTE networks, NR networks, etc.), TDMA networks, FDMA networks, Orthogonal FDMA (OFDMA) networks, Single-Carrier FDMA (SC-FDMA) networks, and so on.

A UE may be capable of operating in multiple radio access technologies (RATs). For example, a UE may be capable of operating in a first RAT (e.g., NR) and in a second RAT (e.g., LTE). These are merely examples, and first and second RATs may be any of the RATs currently known (e.g., WiMax, CDMA, WCDMA, UTRA, Evolved Universal Terrestrial Radio Access (E-UTRA), GSM, FDMA, GSM, TDMA, etc.).

Also, a UE may be capable of operating in multiple RATs at the same time. For example, a UE that can operate in both LTE and NR simultaneously is an E-UTRA-NR Dual Connectivity (ENDC) capable UE. Note that ENDC is an example of Multi-RAT DC (MRDC) capability. In general, when an MRDC capable UE is operating in two RATs, it may be communicating with a base station (e.g., eNB) of a first RAT (e.g., NR) and with a base station (e.g., gNB) of a second RAT (e.g., LTE). When the UE operates in the first RAT, it may communicate with a network node (e.g., base station, gNB, etc.) of the first RAT. Similarly, when the UE operates in the second RAT, it may communicate with a network node (e.g., base station, eNB, etc.) of the second RAT.

The UE may be capable of operating in a standalone (SA) or in a non-standalone (NSA) mode within a given RAT. When operating in the SA mode, the UE is able to exchange both control and data plane (also referred to as user plane) information with the network node and/or the core network of the given RAT (e.g., NR). When operating in the NSA mode, the UE is communicating with network nodes of the first and second RATs. In the NSA mode, the UE can exchange data plane information with the network nodes of both the first RAT (e.g., NR) and the second RAT (e.g., LTE). However, the control plane information is exchanged only with the network node of the second RAT (e.g., LTE).

A great majority of 5G UEs use either 4G or 3G SIM cards. Unfortunately, the UPLMN list and/or the OPLMN list in the 4G or 3G SIM cards may not be valid for 5G. As a result, a roaming 5G UE may spend time and resources attempting to attach to a wrong PLMN and ultimately will be rejected.

Complicating matters, 5G includes standalone (SA) and non-standalone (NSA) modes, and different modes may get different registration results. For 4G LTE, there can be a preferred list of roaming PLMNs. Such list may be invalid for NSA service. A common issue that is observed is that when an NSA mode UE moves to a roaming area, the UE may first select a PLMN in the preferred list for registration only to be rejected or receive secondary cell group (SCG) failure message. Thereafter, a valid LTE PLMN that supports NSA service may be selected.

Figure 3:
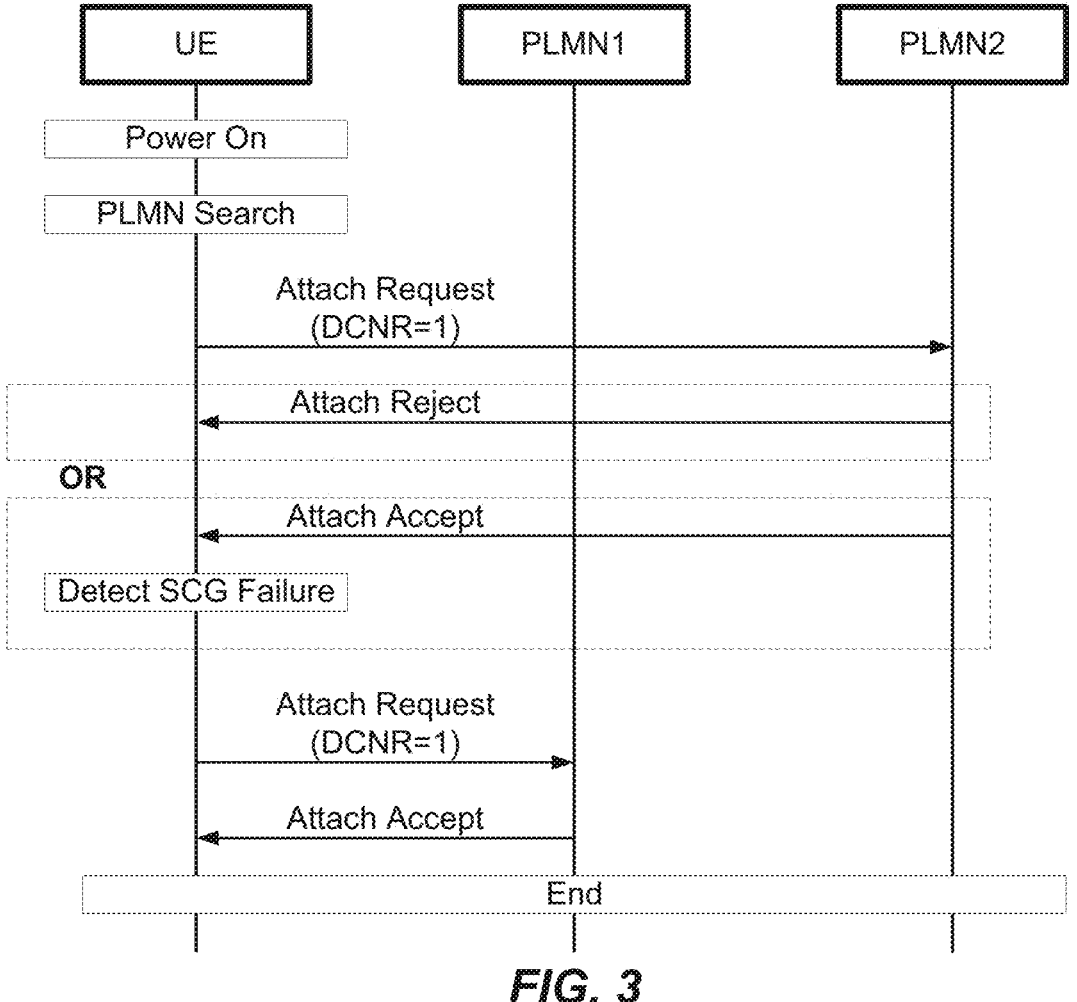
FIG. 3 illustrates a flow of an example conventional scenario for a roaming UE in non-standalone mode to attach to an appropriate public land mobile network.

FIG. 3 illustrates an example flow of a scenario for a roaming UE in NSA mode to attach to a PLMN that provides NSA services. The flow in scenario of FIG. 3 is an example of a conventional flow. In FIG. 3, the following may be assumed:

UE:
   Is 5G capable;
   Is in NSA mode;
   Is roaming:
PLMN1:
   Provides NSA services (e.g., LTE NSA);
   Is not in EHPLMN/UPLMN/OPLMN list of UE's SIM
      card;
   Signal power (as measured by the UE) is low;
PLMN2:
   Does not provide NSA services (e.g., LTE only, secondary cell group (SCG) failures, etc.);
   Is in UPLMN/OPLMN list of UE's SIM card;
   Signal power (as measured by the UE) is high.
The sequence in scenario of FIG. 3 is as follows:
1. UE is powered on;
2. UE conducts a PLMN search and finds PLMN1 and PLMN2:
   PLMN2 has higher priority than PLMN1 (e.g., PLMN2 is in the UPLMN/OPLMN list while PLMN1 is not);
   Even if both have equal priority, PLMN2 would be preferred since it has higher signal power;
3. UE selects and sends an Attach Request message to PLMN2 with an indication that the UE is dual connectivity capable (e.g., dual connectivity with NR (DCNR) =1);
4a. PLMN2 responds with an Attach Reject message since it does not support NSA mode (first dashed box); or
4b. PLMN2 responds with an Attach accept message, but UE later detects secondary SCG failure (e.g., SCG radio link failure (RLF), SCG configuration failure, SCG integrity failure, etc.) (second dashed box);
5. UE selects and sends an Attach Request message to PLMN1 with an indication that the UE is dual connectivity capable (e.g., DCNR=1);
6. PLMN1 responds with an Attach Accept message;
Thereafter, the UE may register with PLMN1 and receive the NSA services. Note that in the conventional scenario of FIG. 3, the UE may spend time and resources to attempting to attach to a wrong PLMN.

To address such issues, it is proposed to maintain within the UE a roaming preferred PLMN list for NSA mode (RPPL_NSA) that includes a list of preferred PLMNs for NSA service while the UE is roaming. That is, RPPL_NSA may include or otherwise identify one or more NSA capable PLMNs (or simply NSA PLMNs) preferred by the operator of HPLMN/EHPLMN. For example, the operator may have roaming agreements in place with operators of the NSA PLMNs. When roaming, the NSA PLMNs may be prioritized over the UPLMNs and/or the OPLMNs. However, the HPLMN/EHPLMN may still be prioritized over the NSA PLMNs of RPPL_NSA. The NSA PLMNs RPPL_NSA may be maintained or stored in a memory of the UE.

Figure 4:
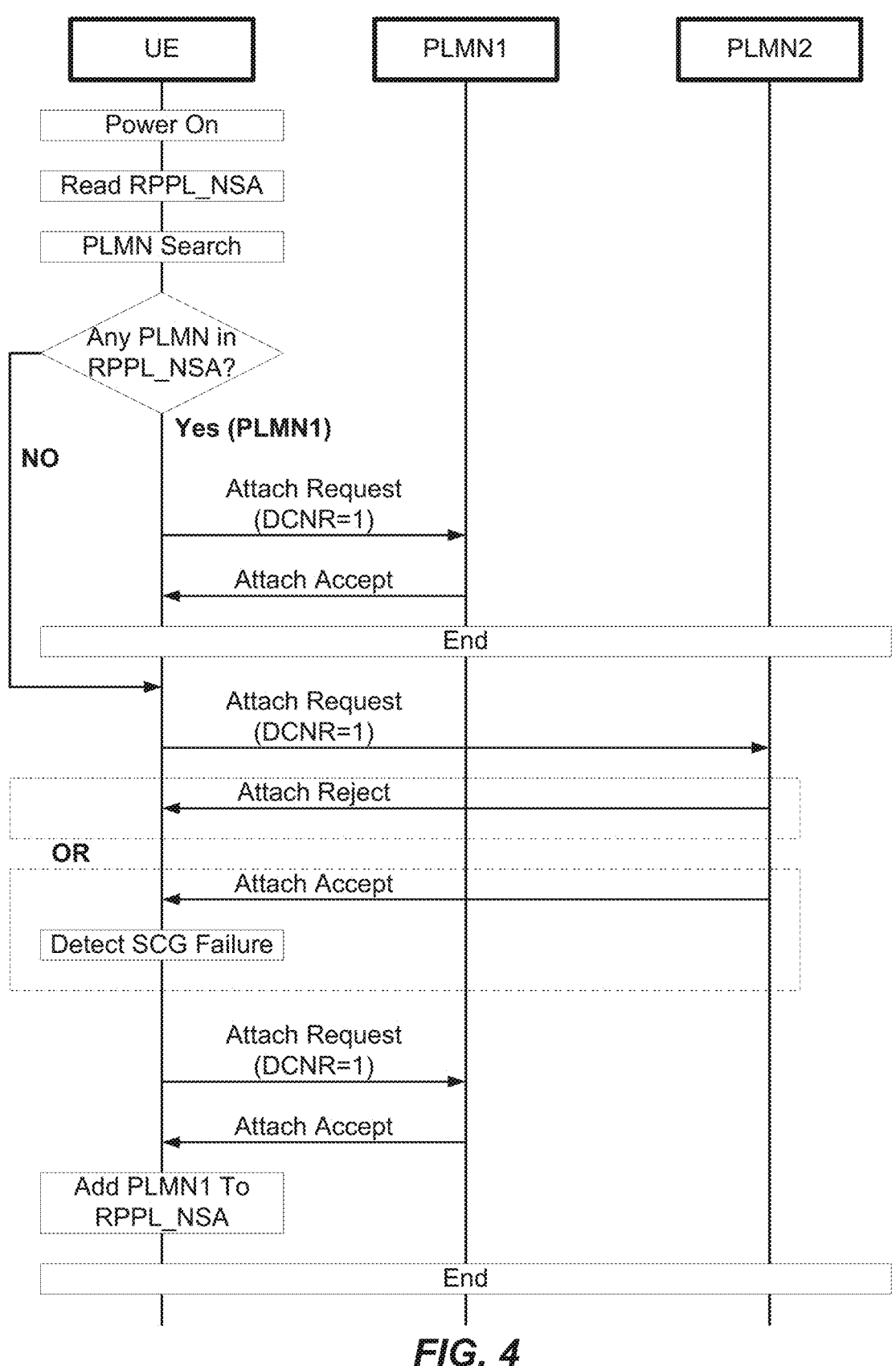
FIG. 4 illustrates a flow of an example scenario for roaming UE in non-standalone mode to attach to an appropriate public land mobile network in accordance with one or more aspects of the disclosure.

FIG. 4 illustrates an example flow of a scenario for a roaming UE in NSA mode to attach to a PLMN that provides NSA services in accordance with one or more aspects. In FIG. 4, the following may be assumed (similar to FIG. 3):

UE:
  Is 5G capable;
  Is in NSA mode;
  Is roaming;
PLMN1:
  Provides NSA services (e.g., LTE NSA);
  Is not in EHPLMN/UPLMN/OPLMN list of UE's SIM card;
  Signal power (as measured by the UE) is low;
PLMN2:
  Does not provide NSA services (e.g., LTE only, SCG failures, etc.);
  Is in UPLMN/OPLMN list of UE's SIM card;
  Signal power (as measured by the UE) is high.

One difference is that in FIG. 4, it is assumed that RPPL_NSA is maintained in the UE (e.g., in UE's memory). In upper portion of FIG. 4, it is assumed that PLMN1 is included in RPPL_NSA (sequence numbers 4-6). In lower portion of FIG. 4, it is assumed that PLMN1 is not included in RPPL_NSA (sequence numbers 4, 7-11).

The sequence in scenario of FIG. 4 may be as follows:
1. UE is powered on;
2. UE reads RPPL_NSA;
3. UE conducts a PLMN search and finds PLMN1 and PLMN2;
4. UE determines whether PLMN1 or PLMN2 is in RPPL_NSA, i.e., determines whether PLMN1 and/or PLMN2 are NSA PLMNs:
   If so, go to 5;
   If not, go to 7;
5. UE selects and sends an Attach Request message to PLMN1 with an indication that the UE is dual connectivity capable (e.g., DCNR=1):
   Here, it is assumed that PLMN1 is included in RPPL_NSA. Then PLMN1 may be prioritized over PLMN2 (e.g., NSA PLMNs prioritized over UPLMN/OPLMN):
6. PLMN1 responds with an Attach Accept message;
7. UE selects and sends an Attach Request message to PLMN2 with an indication that the UE is dual connectivity capable (e.g., DCNR=1);
   Here, it is assumed that PLMN1 is not included in RPPL_NSA. Then the UE may attempt attaching in conventional manner (e.g., see FIG. 3);
8a. PLMN2 responds with an Attach Reject message since it does not support NSA mode (first dashed box); or
8b. PLMN2 responds with an Attach accept message, but UE later detects secondary SCG failure (e.g., SCG radio link failure (RLF), SCG configuration failure, SCG integrity failure, etc.) (second dashed box);
9. UE selects and sends an Attach Request message to PLMN1 with an indication that the UE is dual connectivity capable (e.g., DCNR=1);
10. PLMN1 responds with an Attach Accept message;
11. UE adds PLMN1 to RPPL_NSA.

Thereafter, the UE may register with PLMN1 and receive the NSA services. Note that in the scenario of FIG. 4, the UE may attach to the appropriate PLMN quickly if the PLMN search finds one or more NSA PLMNs of RPPL_NSA. If the PLMN search does not find any NSA PLMN, then conventional network selection procedure may be performed. If the conventional network selection procedure yields an appropriate PLMN, then the UE may update RPPL_NSA to include the PLMN so future network selection while roaming may be performed efficiently.

Figure 5:
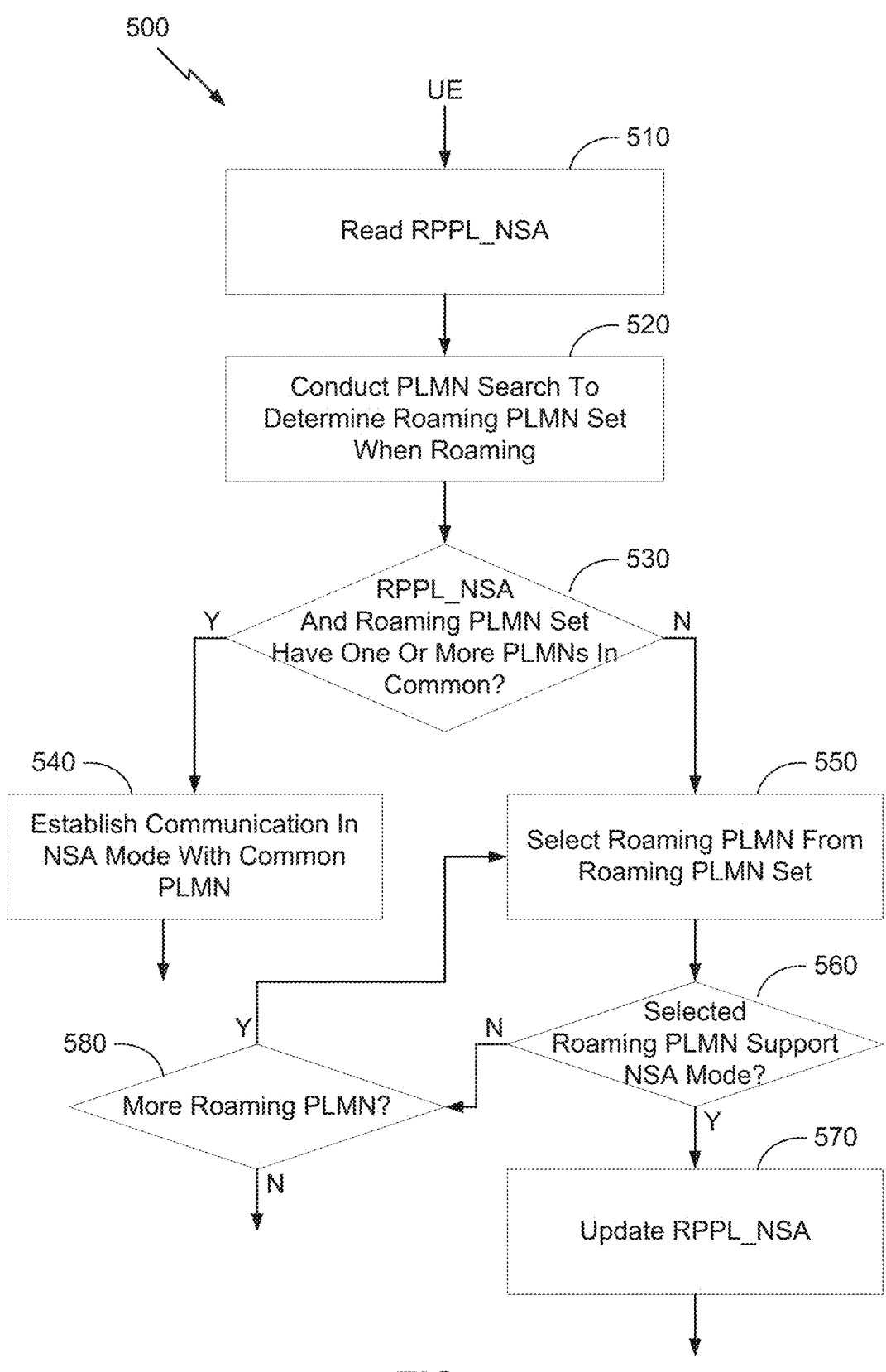
FIGS. 5-7 illustrate flow charts of an exemplary method performed by a roaming user equipment to attach to a public land mobile network that provides non-standalone services in accordance with one or more aspects of the disclosure.

FIG. 5 illustrates a flow chart of an exemplary method 500 performed by a UE, while roaming, to attach to a PLMN that provides NSA services. FIG. 5 may be viewed as a generalization of the flow of FIG. 4. Here, the UE (such as the UE 202) may be capable of operating in multiple radio access technologies (RATs) including first (e.g., 5G NR) and second (e.g., 4G LTE) RATs, e.g., in NSA mode.

In block 510, the UE, when roaming, may read RPPL_NSA. Means for performing block 510 may include the processing system 232 and/or the memory component 238 of the UE 202. The RPPL_NSA may comprise a list of one or more NSA PLMNs that allow access to the UE when the UE is roaming. The RPPL_NSA may be maintained within the UE. For example, the RPPL_NSA may be stored in UE's memory.

The RPPL_NSA may initially be populated and/or updated according to information from operator of HPLMN/ EHPLMN (e.g., specification, website, etc.) and/or according to historical database. For example, the operator of HPLMN and/or the operator of EHPLMN may have roaming agreements in place operators of NSA PLMNs of the RPPL_NSA. Alternatively or in addition thereto, the RPPL_NSA may be initially populated and/or updated as part of an overall system process to update the UE (e.g., when the UE's operating system is updated, major security update, etc.).

In an aspect, at least when the UE is roaming, the NSA PLMNs of the RPPL_NSA may have higher priority than any UPLMN and/or OPLMN. That is, when the UE is roaming and is searching for a network, the UE may prioritize connecting with any of the NSA PLMNs over any of the UPLMNs and/or over any of the OPLMNs. The UPLMNs and/or the OPLMNs may be included in the SIM card 256.

In block 520, the UE may conduct a PLMN search to determine whether there are any PLMNs available for connection. Means for performing block 520 may include the processing system 232, the memory component 238 and/or the transceiver 208.

Since the UE is assumed to be roaming in block 520, the PLMNs may be referred to as "roaming" PLMNs, i.e., the UE may determine whether there are any roaming PLMNs. For ease of description, concept of a roaming PLMN set will be used in which the roaming PLMN set includes one or more roaming PLMNs. Then block 520 may be rephrased as the UE conducting a PLMN search to determine a roaming PLMN set when the UE is roaming.

In block 530, the UE may determine whether any roaming PLMN is included in the RPPL_NSA, i.e., determine whether any roaming PLMN is also an NSA PLMN. To state it another way, the UE may determine whether the RPPL_NSA and the roaming PLMN set have one or more PLMNs in common. Means for performing block 530 may include the processing system 232 and/or the memory component 238 of the UE 202.

If it is determined in block 530 that the RPPL_NSA and the roaming PLMN set do have one or more PLMNs in common ('Y' branch from block 530), then in block 540, the UE may establish communication in an NSA mode with a common PLMN. In this context, the common PLMN may be one of the PLMNs common to both the RPPL_NSA and the roaming PLMN set. Means for performing block 540 may include the processing system 232, the memory component 238 and/or the transceiver 208 of the UE 202.

Figures 6, 7:
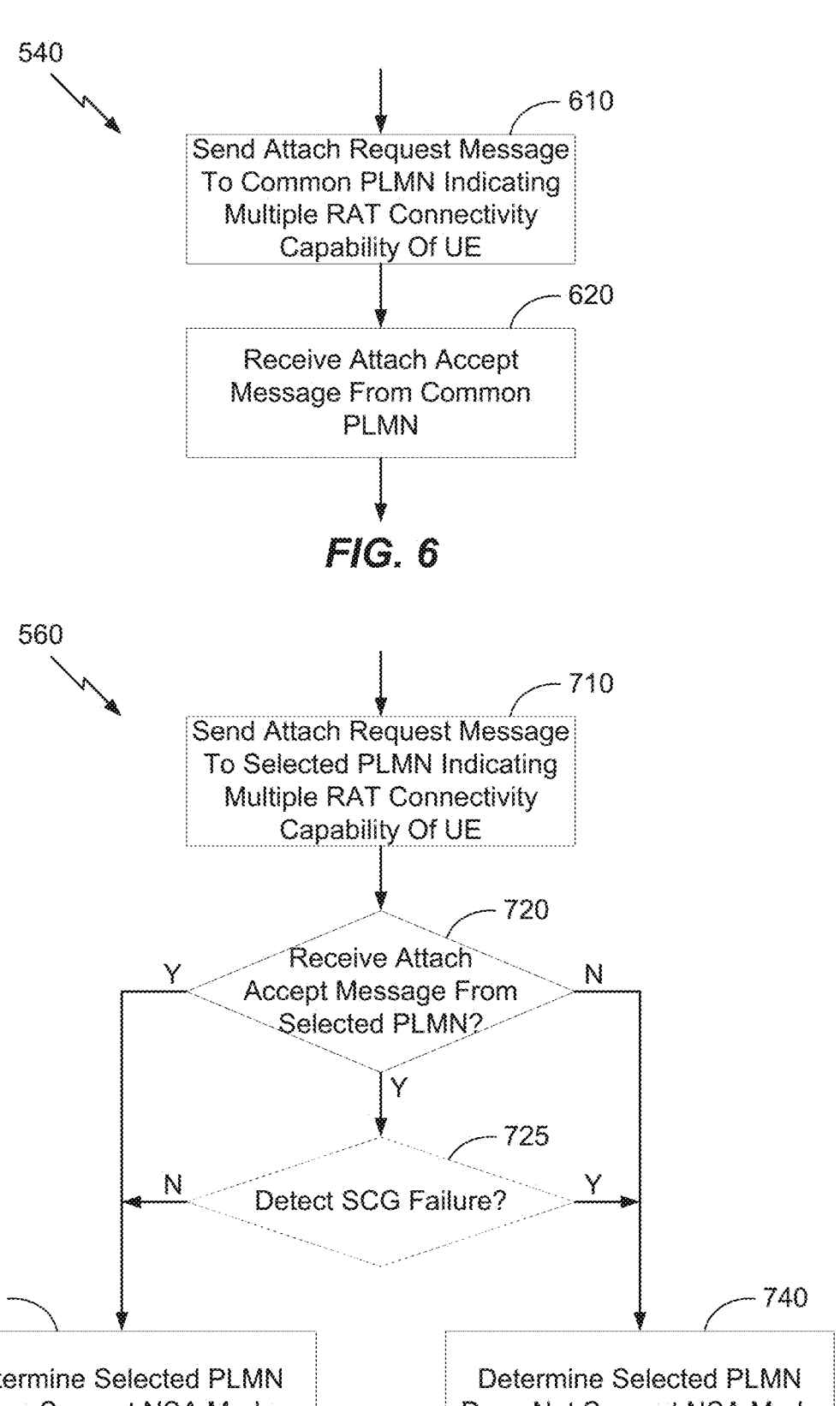

FIG. 6 illustrates a flow chart of an example process that may be performed by the UE to implement block 540. In block 610, the UE may send an attach request message to the common PLMN. The attach request message may indicate that the UE is dual connectivity capable. For example, the UE may set DCNR=1. Means for performing block 610 may include the processing system 232, the memory component 238, and/or the transceiver 208 of the UE 202.

Subsequently, in block 620, the UE may receive an attach accept message from the common PLMN. Means for performing block 620 may include the processing system 232, the memory component 238, and/or the transceiver 208 of the UE 202. Thereafter, the UE may be registered to and conduct communication with the common PLMN (not shown).

Referring back to FIG. 5, if it is determined in block 530 that the RPPL_NSA and the roaming PLMN set do not have any PLMNs in common ('N' branch from block 530), then in block 550, the UE may select a roaming PLMN from the roaming PLMN set. That is, the UE may select one of the one or more roaming PLMNs. Means for performing block 550 may include the processing system 232 and/or the memory component 238 of the UE 202.

In block 560, the UE may determine whether the selected roaming PLMN supports the NSA mode. Means for performing block 560 may include the processing system 232, the memory component 238 and/or the transceiver 208 of the UE 202.

FIG. 7 illustrates a flow chart of an example process that may be performed by the UE to implement block 560. In block 710, the UE may send an attach request message to the selected roaming PLMN. The attach request message may indicate that the UE is dual connectivity capable. For example, the UE may set DCNR=1. Means for performing block 710 may include the processing system 232, the memory component 238, and/or the transceiver 208 of the UE 202.

Subsequently, in block 720, the UE may determine whether an attach accept message is received from the selected roaming PLMN. Means for performing block 720 may include the processing system 232, the memory component 238, and/or the transceiver 208 of the UE 202.

If it is determined in block 720 that the attach accept message is received from the selected roaming PLMN (left 'Y' branch from block 720), then in block 730, the UE may determine that the selected roaming PLMN does support the NSA mode. Means for performing block 730 may include the processing system 232, the memory component 238 and/or the transceiver 208 of the UE 202.

On the other hand, if it is determined in block 720 that a response message other than the attach accept message is received from the selected roaming PLMN ('N' branch from block 720), then in block 740, the UE determine that the selected roaming PLMN does not support the NSA mode. An attach reject message may be an example of such response messages. Means for performing block 740 may include the processing system 232, the memory component 238 and/or the transceiver 208 of the UE 202.

In an alternative aspect, if the attach accept message is received (lower 'Y' branch from block 720), the UE in block 725 may determine whether a secondary cell group (SCG) failure has occurred. For example, after receiving the attach accept message, the UE may determine whether an initial attempt at establishing radio links with secondary cells is successful or not. Means for performing block 725 may include the processing system 232, the memory component 238, and/or the transceiver 208 of the UE 202.

If it is determined in block 725 that SCG failure has not occurred ('N' branch from block 725), then the UE may proceed to block 730 to determine that the selected roaming PLMN does support the NSA mode. Continuing with the example above, if the initial attempt at establishing radio links with secondary cells is successful, the UE may determine that the SCG failure has not been detected.

On the other hand, if it is determined in block 725 that SCG failure has occurred ('Y' branch from block 725), then the UE may proceed to block 740 to determine that the selected roaming PLMN does not support the NSA mode. Again continuing with the example above, if the initial attempt at establishing radio links with secondary cells is not successful, the UE may determine that the SCG failure has been detected.

Referring back to FIG. 5, if it is determined in block 560 that the selected roaming PLMN does support the NSA mode ('Y' branch from block 560), then in block 570, the UE may update the RPPL_NSA to include the selected roaming PLMN. The UE may also be registered to and conduct communication with the selected roaming PLMN (not shown). Means for performing block 560 may include the processing system 232 and/or the memory component 238 of the UE 202.

On the other hand, if it is determined in block 560 that the selected roaming PLMN does not support the NSA mode ('N' branch from block 560), then in block 580, the UE may determine whether there are more roaming PLMN in the roaming PLMN set. If so ('Y' branch from block 580), the UE may proceed back to block 550 to select another roaming PLMN from the roaming PLMN set. Means for performing block 570 may include the processing system 232 and/or the memory component 238 of the UE 202.

It should be noted that not all illustrated blocks of FIGS. 5-7 need to be performed, i.e., some blocks may be optional. Also, the numerical references to the blocks in FIGS. 5-7 should not be taken as requiring that the blocks should be performed in a certain order. Indeed, some blocks may be performed concurrently.

Figure 8:
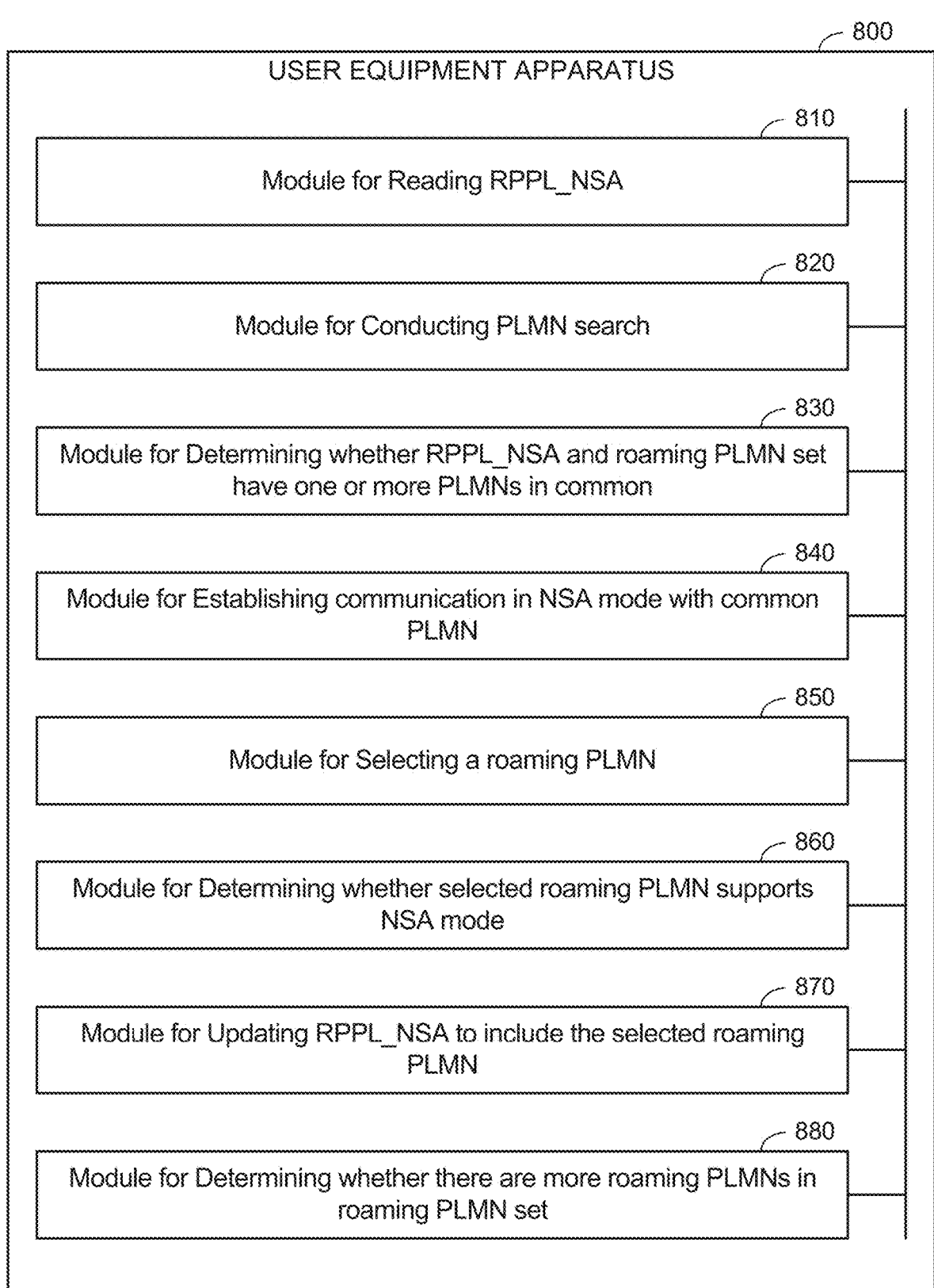
FIG. 8 illustrates a simplified block diagram of several sample aspects of a roaming apparatus configured for attaching to a public land mobile network that provides non-standalone services in accordance with one or more aspects of the disclosure.

FIG. 8 illustrates an example user equipment apparatus 800 represented as a series of interrelated functional modules connected by a common bus. Each of the modules may be implemented in hardware or as a combination of hardware and software. For example, the modules may be implemented as any combination of the modules of the UE apparatus 202 of FIG. 2. A module for reading the RPPL_NSA 810 may correspond at least in some aspects to a processing system (e.g., processing system 232) and/or a memory component (e.g., memory component 238). A module for conducting the PLMN search 820 may correspond at least in some aspects to a communication device (e.g., communication device 208), a processing system (e.g., processing system 232) and/or a memory component (e.g., memory component 238). A module for determining whether the RPPL_NSA and the roaming PLMN set have one or more PLMNs in common 830 may correspond at least in some aspects to a processing system (e.g., processing system 232) and/or a memory component (e.g., memory component 238). A module for establishing communication in the NSA mode with the common PLMN 840 may correspond at least in some aspects to a communication device (e.g., communication device 208), a processing system (e.g., processing system 232), and/or a memory component (e.g., memory component 238). A module for selecting a roaming PLMN 850 may correspond at least in some aspects to a processing system (e.g., processing system 232) and/or a memory component (e.g., memory component 238). A module for determining whether the selected roaming PLMN supports the NSA mode 860 may correspond at least in some aspects to a communication device (e.g., communication device 208), a processing system (e.g., processing system 232), and/or a memory component (e.g., memory component 238). A module for updating the RPPL_NSA to include the selected roaming PLMN 870 may correspond at least in some aspects to a processing system (e.g., processing system 232) and/or a memory component (e.g., memory component 238). A module for determining whether there are more roaming PLMNs in the roaming PLMN set 880 may correspond at least in some aspects to a processing system (e.g., processing system 232) and/or a memory component (e.g., memory component 238).

The functionality of the modules of FIG. 8 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 8, as well as other components and functions described herein, may be implemented using any suitable means. Such means also may be implemented, at least in part, using corresponding structure as taught herein. For example, the components described above in conjunction with the "module for" components of FIG. 8 also may correspond to similarly designated "means for" functionality. Thus, in some aspects one or more of such means may be implemented using one or more of processor components, integrated circuits, or other suitable structure as taught herein.

Implementation examples are described in the following numbered clauses:

Clause 1: A method of a user equipment (UE), comprising: reading a roaming preferred public land mobile network (PLMN) list for non-standalone (NSA) service (RPPL_NSA) comprising a list of one or more NSA PLMNs that allow access to the UE while roaming; conducting a PLMN search to determine a roaming PLMN set when the UE is roaming, the roaming PLMN set comprising one or more roaming PLMNs; determining whether the RPPL_NSA and the roaming PLMN set have one or more PLMNs in common; and establishing communication in an NSA mode with a common PLMN when it is determined that the RPPL_NSA and the roaming PLMN set do have one or more PLMNs in common, the common PLMN being one of the PLMNs common to both the RPPL_NSA and the roaming PLMN set.

Clause 2: The method of Clause 1, wherein the one or more NSA PLMNs of the RPPL_NSA are higher in priority than a user controlled PLMN (UPLMN) and/or an operator controlled PLMN (OPLMN).

Clause 3: The method of any of Clauses 1-2, wherein the RPPL_NSA is stored in the memory of the UE.

Clause 4: The method of any of Clauses 1-3, wherein establishing communication in the NSA mode with the common PLMN comprises: sending an attach request message to the common PLMN, the attach request message indicating that the UE is dual connectivity capable; and receiving an attach accept message from the common PLMN subsequent to sending the attach request message.

Clause 5: The method of any of Clauses 1-4, further comprising: selecting a roaming PLMN from the roaming PLMN set when it is determined that the RPPL_NSA and the roaming PLMN have no PLMNs in common; determining whether the selected roaming PLMN supports the NSA mode; and updating the RPPL_NSA to include the selected roaming PLMN when it is determined that the selected roaming PLMN supports the NSA mode.

Clause 6: The method of Clause 5, wherein determining whether the selected roaming PLMN supports the NSA mode comprises: sending an attach request message to the selected roaming PLMN, the attach request message indicating that the UE is dual connectivity capable; determining that the selected roaming PLMN supports the NSA mode when an attach accept message is received from the selected roaming PLMN subsequent to sending the attach request message; and determining that the selected roaming PLMN does not support the NSA mode when a response message other than the attach accept message is received from the selected roaming PLMN subsequent to sending the attach request message.

Clause 7: The method of Clause 5, wherein determining whether the selected roaming PLMN supports the NSA mode comprises: sending an attach request message to the selected roaming PLMN, the attach request message indicating that the UE is dual connectivity capable; receiving an attach accept message from the selected roaming PLMN subsequent to sending the attach request message; determining that the selected roaming PLMN supports the NSA mode when a secondary cell group (SCG) failure is not detected subsequent to receiving the attach accept message; and determining that the selected roaming PLMN does not support the NSA mode when the SCG failure is detected subsequent to receiving the attach accept message.

Clause 8: The method of any of Clauses 1-7, wherein the RPPL_NSA is initially populated and/or updated based on information from an operator of home PLMN (HPLMN) and/or an operator of an equivalent HPLMN (EHPLMN) of the UE.

Clause 9: A user equipment comprising at least one means for performing a method of any of Clauses 1-8.

Clause 10: A user equipment comprising a memory, a transceiver, and a processor communicatively connected to the memory and the transceiver, the processor being configured perform a method of any of Clauses 1-8.

Clause 11: A non-transitory computer-readable medium storing code for a user equipment comprising a memory, a transceiver, and a processor communicatively connected to the memory and the transceiver, and instructions stored in the memory and executable by the processor to cause the user equipment to perform a method of any of Clauses 1-8.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A user equipment (UE) comprising:
   a memory;
   a transceiver; and
   a processor communicatively connected to the memory and the transceiver, the processor being configured to:
   read a roaming preferred public land mobile network (PLMN) list for non-standalone (NSA) service (RPPL_NSA) comprising a list of one or more NSA PLMNs that allow access to the UE while roaming;
   conduct a PLMN search to determine a roaming PLMN set when the UE is roaming, the roaming PLMN set comprising one or more roaming PLMNs;
   determine whether the RPPL_NSA and the roaming PLMN set have one or more PLMNs in common; and
   establish communication, via the transceiver, in an NSA mode with a common PLMN when it is determined that the RPPL_NSA and the roaming PLMN set do have one or more PLMNs in common, the common PLMN being one of the PLMNs common to both the RPPL_NSA and the roaming PLMN set,
   wherein in the NSA mode, the UE communicates with the common PLMN in both a first radio access technology (RAT) and a second RAT different from the first RAT.

2. The UE of claim 1, wherein the one or more NSA PLMNs of the RPPL_NSA are higher in priority than a user controlled PLMN (UPLMN) and/or an operator controlled PLMN (OPLMN).

3. The UE of claim 1, wherein the RPPL_NSA is stored in the memory of the UE.

4. The UE of claim 1, wherein in establishing communication in the NSA mode with the common PLMN, the processor is configured to:

send, via the transceiver, an attach request message to the common PLMN, the attach request message indicating that the UE is dual connectivity capable; and receive, via the transceiver, an attach accept message from the common PLMN subsequent to sending the attach request message.

5. The UE of claim 1, wherein the processor is further configured to:

select a roaming PLMN from the roaming PLMN set when it is determined that the RPPL_NSA and the roaming PLMN have no PLMNs in common;

determine whether the selected roaming PLMN supports the NSA mode; and update the RPPL_NSA to include the selected roaming PLMN when it is determined that the selected roaming PLMN supports the NSA mode.

6. The UE of claim 5, wherein in determining whether the selected roaming PLMN supports the NSA mode, the processor is configured to:

send, via the transceiver, an attach request message to the selected roaming PLMN, the attach request message indicating that the UE is dual connectivity capable;

determine that the selected roaming PLMN supports the NSA mode when an attach accept message is received from the selected roaming PLMN subsequent to sending the attach request message; and determine that the selected roaming PLMN does not support the NSA mode when a response message other than the attach accept message is received from the selected roaming PLMN subsequent to sending the attach request message.

7. The UE of claim 5, wherein in determining whether the selected roaming PLMN supports the NSA mode, the processor is configured to:

send, via the transceiver, an attach request message to the selected roaming PLMN, the attach request message indicating that the UE is dual connectivity capable;

receive, via the transceiver, an attach accept message from the selected roaming PLMN subsequent to sending the attach request message;

determine that the selected roaming PLMN supports the NSA mode when a secondary cell group (SCG) failure is not detected subsequent to receiving the attach accept message; and determine that the selected roaming PLMN does not support the NSA mode when the SCG failure is detected subsequent to receiving the attach accept message.

8. The UE of claim 1, wherein the RPPL_NSA is initially populated and/or updated based on information from an operator of home PLMN (HPLMN) and/or an operator of an equivalent HPLMN (EHPLMN) of the UE.

9. A method of a user equipment (UE), the method comprising:

reading a roaming preferred public land mobile network (PLMN) list for non-standalone (NSA) service (RPPL_NSA) comprising a list of one or more NSA PLMNs that allow access to the UE while roaming;

conducting a PLMN search to determine a roaming PLMN set when the UE is roaming, the roaming PLMN set comprising one or more roaming PLMNs;

determining whether the RPPL_NSA and the roaming PLMN set have one or more PLMNs in common; and establishing communication in an NSA mode with a common PLMN when it is determined that the RPPL_NSA and the roaming PLMN set do have one or more PLMNs in common, the common PLMN being one of the PLMNs common to both the RPPL_NSA and the roaming PLMN set, wherein in the NSA mode, the UE communicates with the common PLMN in both a first radio access technology (RAT) and a second RAT different from the first RAT.

10. The method of claim 9, wherein the one or more NSA PLMNs of the RPPL_NSA are higher in priority than a user controlled PLMN (UPLMN) and/or an operator controlled PLMN (OPLMN).

11. The method of claim 9, wherein the RPPL_NSA is stored in a memory of the UE.

12. The method of claim 9, wherein establishing communication in the NSA mode with the common PLMN comprises:

sending an attach request message to the common PLMN, the attach request message indicating that the UE is dual connectivity capable; and receiving an attach accept message from the common PLMN subsequent to sending the attach request message.

13. The method of claim 9, further comprising:

selecting a roaming PLMN from the roaming PLMN set when it is determined that the RPPL_NSA and the roaming PLMN have no PLMNs in common;

determining whether the selected roaming PLMN supports the NSA mode; and updating the RPPL_NSA to include the selected roaming PLMN when it is determined that the selected roaming PLMN supports the NSA mode.

14. The method of claim 13, wherein determining whether the selected roaming PLMN supports the NSA mode comprises:

sending an attach request message to the selected roaming PLMN, the attach request message indicating that the UE is dual connectivity capable;

determining that the selected roaming PLMN supports the NSA mode when an attach accept message is received from the selected roaming PLMN subsequent to sending the attach request message; and determining that the selected roaming PLMN does not support the NSA mode when a response message other than the attach accept message is received from the selected roaming PLMN subsequent to sending the attach request message.

15. The method of claim 13, wherein determining whether the selected roaming PLMN supports the NSA mode comprises:

sending an attach request message to the selected roaming PLMN, the attach request message indicating that the UE is dual connectivity capable;

receiving an attach accept message from the selected roaming PLMN subsequent to sending the attach request message;

determining that the selected roaming PLMN supports the NSA mode when a secondary cell group (SCG) failure is not detected subsequent to receiving the attach accept message; and determining that the selected roaming PLMN does not support the NSA mode when the SCG failure is detected subsequent to receiving the attach accept message.

16. The method of claim 9, wherein the RPPL_NSA is initially populated and/or updated based on information from an operator of home PLMN (HPLMN) and/or an operator of an equivalent HPLMN (EHPLMN) of the UE.

17. A user equipment (UE), comprising:

means for reading a roaming preferred public land mobile network (PLMN) list for non-standalone (NSA) service (RPPL_NSA) comprising a list of one or more NSA PLMNs that allow access to the UE while roaming;

means for conducting a PLMN search to determine a roaming PLMN set when the UE is roaming, the roaming PLMN set comprising one or more roaming PLMNs;

means for determining whether the RPPL_NSA and the roaming PLMN set have one or more PLMNs in common; and means for establishing communication in an NSA mode with a common PLMN when it is determined that the RPPL_NSA and the roaming PLMN set do have one or more PLMNs in common, the common PLMN being one of the PLMNs common to both the RPPL_NSA and the roaming PLMN set, wherein in the NSA mode, the UE communicates with the common PLMN in both a first radio access technology (RAT) and a second RAT different from the first RAT.

18. The UE of claim 17, wherein the one or more NSA PLMNs of the RPPL_NSA are higher in priority than a user controlled PLMN (UPLMN) and/or an operator controlled PLMN (OPLMN).

19. The UE of claim 17, wherein the RPPL_NSA is stored in the memory of the UE.

20. The UE of claim 17, wherein the means for establishing communication in the NSA mode with the common PLMN is configured to:

send an attach request message to the common PLMN, the attach request message indicating that the UE is dual connectivity capable; and receive an attach accept message from the common PLMN subsequent to sending the attach request message.

21. The UE of claim 17, wherein the UE further comprises:

means for selecting a roaming PLMN from the roaming PLMN set when it is determined that the RPPL_NSA and the roaming PLMN have no PLMNs in common;

means for determining whether the selected roaming PLMN supports the NSA mode; and means for updating the RPPL_NSA to include the selected roaming PLMN when it is determined that the selected roaming PLMN supports the NSA mode.

22. The UE of claim 21, wherein the means for determining whether the selected roaming PLMN supports the NSA mode is configured to:

send an attach request message to the selected roaming PLMN, the attach request message indicating that the UE is dual connectivity capable;

determine that the selected roaming PLMN supports the NSA mode when an attach accept message is received from the selected roaming PLMN subsequent to sending the attach request message; and determine that the selected roaming PLMN does not support the NSA mode when a response message other than the attach accept message is received from the selected roaming PLMN subsequent to sending the attach request message.

23. The UE of claim 21, wherein the means for determining whether the selected roaming PLMN supports the NSA mode is configured to:

send an attach request message to the selected roaming PLMN, the attach request message indicating that the UE is dual connectivity capable;

receive an attach accept message from the selected roaming PLMN subsequent to sending the attach request message;

determine that the selected roaming PLMN supports the NSA mode when a secondary cell group (SCG) failure is not detected subsequent to receiving the attach accept message; and determine that the selected roaming PLMN does not support the NSA mode when the SCG failure is detected subsequent to receiving the attach accept message.

24. A non-transitory computer-readable medium storing computer-executable instructions for a user equipment (UE), the computer-executable instructions comprising:

one or more instructions instructing the UE to read a roaming preferred public land mobile network (PLMN) list for non-standalone (NSA) service (RPPL_NSA) comprising a list of one or more NSA PLMNs that allow access to the UE while roaming;

one or more instructions instructing the UE to conduct a PLMN search to determine a roaming PLMN set when the UE is roaming, the roaming PLMN set comprising one or more roaming PLMNs;

one or more instructions instructing the UE to determine whether the RPPL_NSA and the roaming PLMN set have one or more PLMNs in common; and establish communication in an NSA mode with a common PLMN when it is determined that the RPPL_NSA and the roaming PLMN set do have one or more PLMNs in common, the common PLMN being one of the PLMNs common to both the RPPL_NSA and the roaming PLMN set, wherein in the NSA mode, the UE communicates with the common PLMN in both a first radio access technology (RAT) and a second RAT different from the first RAT.

25. The non-transitory computer-readable medium of claim 24, wherein the one or more NSA PLMNs of the RPPL_NSA are higher in priority than a user controlled PLMN (UPLMN) and/or an operator controlled PLMN (OPLMN).

26. The non-transitory computer-readable medium of claim 24, wherein the RPPL_NSA is stored in the memory of the UE.

27. The non-transitory computer-readable medium of claim 24, wherein the one or more instructions instructing the UE to establish communication in the NSA mode with the common PLMN comprises:

one or more instructions instructing the UE to send an attach request message to the common PLMN, the attach request message indicating that the UE is dual connectivity capable; and one or more instructions instructing the UE to receive an attach accept message from the common PLMN subsequent to sending the attach request message.

28. The non-transitory computer-readable medium of claim 24, wherein the computer-executable instructions further comprise:

one or more instructions instructing the UE to select a roaming PLMN from the roaming PLMN set when it is determined that the RPPL_NSA and the roaming PLMN have no PLMNs in common;

one or more instructions instructing the UE to determine whether the selected roaming PLMN supports the NSA mode; and one or more instructions instructing the UE to update the RPPL_NSA to include the selected roaming PLMN when it is determined that the selected roaming PLMN supports the NSA mode.

29. The non-transitory computer-readable medium of claim 28, wherein the one or more instructions instructing the UE to determine whether the selected roaming PLMN supports the NSA mode comprises:

one or more instructions instructing the UE to send an attach request message to the selected roaming PLMN, the attach request message indicating that the UE is dual connectivity capable;

one or more instructions instructing the UE to determine that the selected roaming PLMN supports the NSA mode when an attach accept message is received from the selected roaming PLMN subsequent to sending the attach request message; and one or more instructions instructing the UE to determine that the selected roaming PLMN does not support the NSA mode when a response message other than the attach accept message is received from the selected roaming PLMN subsequent to sending the attach request message.

30. The non-transitory computer-readable medium of claim 28, wherein the one or more instructions instructing the UE to determine whether the selected roaming PLMN supports the NSA mode comprises:

one or more instructions instructing the UE to send an attach request message to the selected roaming PLMN, the attach request message indicating that the UE is dual connectivity capable;

one or more instructions instructing the UE to receive an attach accept message from the selected roaming PLMN subsequent to sending the attach request message;

one or more instructions instructing the UE to determine that the selected roaming PLMN supports the NSA mode when a secondary cell group (SCG) failure is not detected subsequent to receiving the attach accept message; and one or more instructions instructing the UE to determine that the selected roaming PLMN does not support the NSA mode when the SCG failure is detected subsequent to receiving the attach accept message.

* * * * *